United States Patent [19]

Noda

[11] Patent Number: 5,122,577
[45] Date of Patent: Jun. 16, 1992

[54] POLYCATIONIC ESTERIFIED LATEX PRECURSORS HAVING POLYMERIZABLE UNSATURATED SUBSTITUENT GROUPS

[75] Inventor: Isao Noda, Fairfield, Ohio

[73] Assignee: The Procter & Gamble Company, Cincinnati, Ohio

[21] Appl. No.: 516,602

[22] Filed: Apr. 30, 1990

[51] Int. Cl.⁵ .......................................... C08F 283/04
[52] U.S. Cl. ..................................... 525/426; 525/421
[58] Field of Search ......................................... 525/426

[56] References Cited

U.S. PATENT DOCUMENTS

| | | | |
|---|---|---|---|
| 2,745,744 | 5/1956 | Weidner et al. | 162/168 |
| 3,556,932 | 1/1971 | Coscia et al. | 162/166 |
| 3,556,933 | 1/1971 | Williams et al. | 162/167 |
| 3,700,623 | 10/1972 | Keim | 260/80.3 |
| 3,772,076 | 11/1973 | Keim | 117/155 |
| 3,926,890 | 12/1975 | Huang et al. | 260/29.6 |
| 3,932,363 | 1/1976 | Lehmann et al. | 525/426 |
| 4,121,966 | 10/1978 | Amano et al. | 162/164 |
| 4,189,345 | 2/1980 | Foster et al. | 162/168 |
| 4,785,030 | 11/1988 | Noda et al. | 523/201 |
| 4,835,211 | 5/1989 | Noda et al. | 524/762 |

Primary Examiner—Ana L. Carrillo
Attorney, Agent, or Firm—Jerry J. Yetter; Leonard W. Lewis; Richard C. Witte

[57] ABSTRACT

Polycationic wet-strength materials such as KYMENE are chemically modified to provide unsaturated hydrocarbon substituents. The modified KYMENE is cross-linked onto and into latex particles to provide improved wet-strength agents for use in paper treatments. Thus, KYMENE is reacted, for example, with acrylic acid and cross-linked with styrene/butadiene to provide a polycationic latex wet-strength agent.

1 Claim, No Drawings

POLYCATIONIC ESTERIFIED LATEX PRECURSORS HAVING POLYMERIZABLE UNSATURATED SUBSTITUENT GROUPS

TECHNICAL FIELD

The present invention relates to latex compositions having polycationic surface substituents. The latex compositions are useful as wet-strength agents in paper products.

BACKGROUND OF THE INVENTION

Water-soluble cationic resins are often used as wet-strength additives in papermaking. One widely used type of wet-strength resin is the polyamide/-polyamine/epichlorohydrin material sold under the trade name KYMENE. See, for example, U.S. Pat. No. 3,700.623 to Keim, issued Oct. 24, 1972; and U.S. Pat. No. 3,772,076 to Keim, issued Nov. 13, 1973. Another group of water-soluble cationic wet-strength resins are the polyacrylamides sold under the trade name PAREZ. See, for example, U.S. Pat. No. 3,556,932 to Coscia et al, issued Jan. 19, 1971; and U.S. Pat. No. 3,556.933 to Williams et al, issued Jan. 19, 1971.

The cellulosic fibers used in papermaking are negatively charged. Since the water-soluble wet-strength resins are cationic (positively charged), they are deposited and retained well when directly added to the aqueous pulp slurry. Such "wet-end addition" is highly desirable in papermaking. Subsequently in the papermaking process, these resins cross-link and eventually become insoluble in water. When this occurs, the wet-strength resin acts as a "glue" to hold the fibers of the paper together. This results in the desired wet-strength property.

Paper products made with such resins often have a stiff, paper-like feel. To impart greater softness to the paper product, styrene-butadiene latexes can be used as the binder system. However, these styrene-butadiene latexes are usually either nonionic in character or else are partially anionic due to inclusion of anionic comonomers or surfactants. The nonionic styrenebutadiene latexes cannot be used as "wet-end additives" in a conventional papermaking process. Instead, these nonionic latexes have to be impregnated or pattern-printed on the subsequently laid paper furnish, such as by the process described in European Patent application 33,988 to Graves et al, published Aug. 19, 1981.

An anionic styrene-butadiene latex can be used in a conventional wet-end additive papermaking process by adding a cationic polyelectrolyte. See, for example, U.S. Pat. No. 4,121,966 to Amano et al, issued Oct. 24, 1978; and U.S. Pat. No. 2,745,744 to Weidner et al, issued May 15, 1956. The cationic polyelectrolyte used is typically a water-soluble cationic wet-strength resin. Basically, the cationic polyelectrolyte, when added, destabilizes the dispersed anionic latex particles which then flocculate and deposit on the paper fibers. Accordingly, the cationic polyelectrolyte and anionic styrene-butadiene latex cannot be combined together until the point at which they are used as the binder system in papermaking.

Styrene-butadiene latexes have also been modified to provide cationic groups chemically bound on the surface of the latex particles. See, for example, U.S. Pat. No. 4,189,345 to Foster et al, issued Feb. 19, 1980; and U.S. Pat. No. 3,926,890 to Huang et al, issued Dec. 16, 1975. Incorporation of the cationic groups on the surface of the latex particles converts the latex into a wet-end additive like the water-soluble cationic wetstrength resins. These cationic latexes appear to have adequate colloidal stability, especially when nonionic or preferably cationic surfactants are added. However, the deposition and retention of the cationic latex particles on the paper fibers does not appear to be very great. Indeed, the cationic latex of the Foster et al patent appears to require a co-additive to enhance the deposition of the latex particles on the paper fibers.

Accordingly, a cationic latex which combines: (1) colloidal stability; (2) enhanced deposition and retention of the latex particles on the paper fibers; and (3) enhanced wet-strength properties, would be highly desirable.

The polycationic latexes of this invention provide these desirable benefits.

Despite the various art-described attempts to improve wet-strength resins, the wet-strength resin of choice has remained the polycationic material, KYMENE. Unfortunately, as noted hereinabove, the use of excessive amounts of KYMENE can cause paper therewith to become not only stronger, but also stiffer, which is undesirable for some uses. Stated otherwise, KYMENE not only enhances the wet tensile strength of the paper, but also increases its dry tensile strength, thereby leading to a stiff or brittle feel. This is undesirable in situations where paper with a soft, more cloth-like feel is desired.

Moreover, it has now been determined that KYMENE-type polycationic water-soluble wet-strength resins can undesirably interact with anionic additives which the formulator may wish to incorporate into the paper. For example, various anionic superabsorbent materials have their absorbency undesirably lessened when KYMENE is present.

In the present invention, it has been discovered that KYMENE-type wet-strength resins can be effectively rendered water-insoluble, and thus rendered less reactive to anionic paper additives. Moreover, it has been discovered that the polycationic latexes of the present invention desirably enhance the wet-strength of paper treated therewith, but without causing the paper to have an undesirable stiff feel. In addition, the maximum wet strength obtained with KYMENE seems to peak at about 250 g/in (98.4 g/cm) (for Northern Softwood Kraft Handsheets) whereas the polycationic latexes herein can yield wet strengths as high as 1200 g/in (472.4 g/cm). These and other advantages of the present invention will be appreciated from the disclosure hereinafter.

Besides the papermaking art, there are circumstances where it would be desirable to impart a cationic finish to surfaces such as fabrics in order to provide an antistatic effect. The polycationic latexes of this invention may be considered as substitutes for the quaternary ammonium compounds now typically used as antistats.

BACKGROUND ART

U.S. Pat. Nos. 4,785,030 and 4,835,211 to Noda and Hager, issued Nov. 15, 1988 and May 30, 1989, respectively, describe cationic latexes which impart a soft feel to paper.

U.S. Pat. No. 4,189,345 to Foster et al, issued Feb. 19, 1980, describes a fibrous product containing papermaking pulp, a structured-particle latex having pH independent cationic groups bound at or near the particle surface and a co-additive. The structured-particle latex has a copolymer core of styrene and butadiene, and an encapsulating layer of styrene, butadiene and vinylbenzyl chloride which is reacted with 2-(dimethyl amino) ethanol to form quaternary ammonium groups. The co-additive can be a hydrolyzed polyacrylamide having a degree of polymerization of 5500 and is used to enhance deposition of the cationic latex on the pulp fibers. In making the fibrous product, the structure-particle latex and an aqueous solution of the co-additive are added to an aqueous slurry of the pulp, which is then dewatered and dried by heating.

U.S. Pat. No. 3,926,890 to Huang et al, issued Dec. 16, 1975, discloses a process for preparing a "stable" cationic latex which is described as having "excellent adsorption" (only about 69% absorption of latex based on Example 5) onto substrates such as pulp, paper and the like. The Haung et al cationic latexes are prepared by emulsion polymerization of a haloalkyl ester of acrylic or methylcrylic acid with another monosaturated compound and/or a conjugated diene compound (e.g., butadiene) in the presence of a nonionic or preferably cationic surface active agent, and then reacting a basic nitrogen-containing compound with this copolymer to form the respective ammonium salt.

U.S. Pat. No. 4,121,966 to Amano et al, issued Oct. 24, 1978, discloses a method for producing a fibrous sheet bonded with a latex flocculate. In this method, zinc white powders are added to a carboxy modified anionic latex. The pH of this mixture is adjusted to not less than 7, and then a water-soluble cationic polymer is added to obtain a latex flocculate. The latex flocculate is added to a fiber slurry which is formed into a sheet by a conventional papermaking process. Representative carboxy modified latexes include styrene-butadiene copolymers. Suitable water-soluble cationic polymers include polyamide-polyamine-epichlorohydrin resins, polyethylene imine resins, cationic modified melamine-formalin resins, and cationic modified urea-formalin resins.

U.S. Pat. No. 2,745,744 to Weidner et al, issued May 15, 1956, discloses a method for incorporating polymeric or rubberlike materials into cellulosic fibers used to make paper. In this method, a colloidal dispersion of a hydrophobic polymer, such as a butadiene-styrene latex, is mixed with a paper pulp suspended in water. A poly-N-basic organic compound is then added to this mixture to cause particles of the colloidal dispersed material to adhere to the cellulosic fibers in the water suspension. The treated fiber is then formed into paper by conventional techniques.

SUMMARY OF THE INVENTION

The present invention encompasses the reaction product of a cationic polyamide/polyamine/epichlorohydrin wet-strength resin and a reactant (electrophiles or nucleophiles can be used) comprising an unsaturated polymerizable hydrocarbon moiety. Preferred compositions herein comprise the reaction product of a wet-strength resin containing repeat units of the general structural type

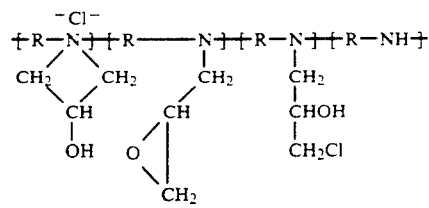

wherein R is

and a carboxylate reactant, wherein said carboxylate reactant contains an unsaturated group. Said carboxylate (or carboxylate-derived) reactant is preferably a member selected from the group consisting of acryleates, methacrylates, itaconates, vinyl benzoates, unsaturated epoxides such as glycidyl methacrylate, unsaturated chlorohydrins such as chlorohydrin methacrylate and unsaturated fatty acids and their reactive derivatives, e.g., acid halides and acid anhydrides, and mixtures thereof.

The invention also encompasses water-insoluble latex composition comprising the reaction product of a cationic polyamide/polyamine/epichlorohydrin wet-strength resin and a reactant comprising an unsaturated polymerizable hydrocarbon moiety, said reaction product being co-polymerized with latex-forming polymerizable monomers or oligomers. Preferred latex-forming polymerizable monomers or oligomers are selected from the group consisting of styrene, 1,3-butadiene, isoprene, propylene, ethylene, and mixtures thereof. Vinyl acetate, methyl acrylate, methyl methacrylate and t-butyl acrylate can also be used.

Preferred latex compositions herein comprise the reaction product of a wet strength resin containing repeat units of the general structural type

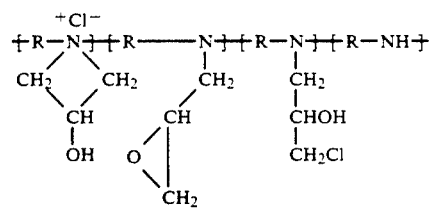

wherein R is

and a carboxylate reactant, said reaction product being co-polymerized with latex-forming polymerizable monomers or oligomers. Said carboxylate (or carboxylate-derived) reactant is preferably a member selected from the group consisting of acrylates, methacrylates, itaconates, vinyl benzoates, unsaturated epoxides such as glycidyl methacrylate, unsaturated chlorohydrins such as chlorohydrin methacrylate, unsaturated fatty acids and their reactive derivatives, e.g., acid halides and anhydrides, and mixtures thereof, and said latex-forming polymers or oligomers are preferably selected from the group consisting of styrene, 1,3-butadiene, isoprene, propylene, ethylene, and mixtures thereof. Vinyl acetate, methyl acrylate, methyl methacrylate and t-butyl acrylate can also be used.

A highly preferred latex composition herein comprises the reaction product of said cationic wet-strength resin and a reactant selected from acrylic acid, methacrylic acid, glycidyl methacrylate, and mixtures thereof, said reaction product being co-polymerized with styrene, 1,3-butadiene, or mixtures thereof.

The latex compositions according to this invention are preferably in the form of particles having an average size (sieve analysis) in the range of from about 10 nm to about 500 nm or to about several microns, preferably about 50 nm to about 500 nm. Such particles are conveniently formed as aqueous dispersions by the procedures disclosed hereinafter.

All percentages, ratios and proportions herein are by weight, unless otherwise specified.

DETAILED DESCRIPTION

The polyamide/polyamine/epichlorohydrin wet-strength resins used in the practice are fully described by Carr, Doane, Hamerstrand and Hofreiter, in an article appearing in the Journal of Applied Polymer Science Vol. 17, pp 721-735 (1973). Such resins are available as KYMENE (e.g., KYMENE 557) from Hercules, Inc. A commercial synthesis of such resins from adipic acid, diethylene triamine and epichlorohydrin is described in the Carr et al publication, ibid., and is U.S. Pat. No. 2,926,154 (Feb. 23, 1960) to G. I. Keim. Reference can be made to these publications for further details regarding the preparation of polyamide/polyamine/epichlorohydrin resins of the type employed to prepare the polycationic latexes herein.

In the practice of this invention, the aforesaid resin is reacted in such a way as to introduce a polymerizable hydrocarbon moiety into the resin's structure. Such moiety can be co-polymerized with other polymerizable latex-forming monomers or oligomers to form a latex incorporating the resin. The resulting latex is polycationic, by virtue of the presence of the resin's polycationic substituents.

While not intending to be bound by theory, it is reasonable to speculate that the overall reaction involves the following, wherein M-X is a reactant comprising a reactive group X which can be, for example, carboxylate (preferred), amine, alkyl halide, chlorohydrin, epoxide, xanthate, acid anhydride, or the like, and wherein M contains at least one —C=C—bond, typically a $C_2$-$C_{16}$ unsaturated hydrocarbyl group, preferably $C_2$-$C_6$. Examples include: acrylate, methacrylate, vinyl benzoate or other vinyl groups, unsaturated fatty acids and derivatives thereof, and the like. The reaction is speculated to occur at the 4-membered ring of KYMENE (i.e., schematically illustrated by the following) or at the secondary amine:

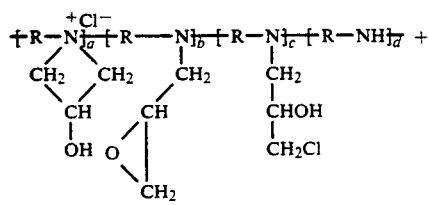

-continued

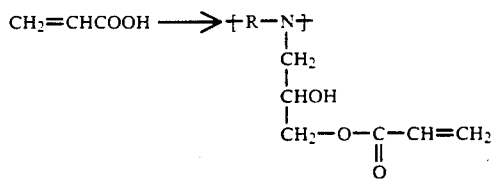

wherein a, b, c and d are each integers typically in the range of 20-500 and R is as disclosed hereinabove. Alternatively, the OH moieties and/or the residual secondary amine of KYMENE are available as reaction sites. As an example, acryloyl chloride could react with KYMENE to produce the structure below:

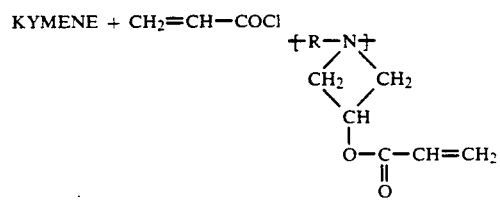

and glycidyl methacrylate could react with KYMENE to produce the structure below:

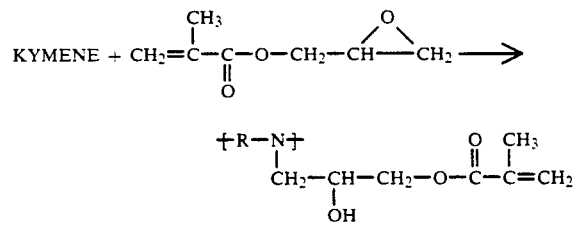

Whatever the mechanism of reaction, the unsaturated hydrocarbon moiety is thus attached to the KYMENE and is available to react with various latex-forming monomers or oligomers, thereby incorporating the KYMENE into and onto the resulting latex particles.

To illustrate the reaction further, KYMENE can be reacted with a member selected from the group consisting of vinyl benzoic acid, itaconic acid, oleic acid, linoleic acid, 3-bromopropyl acrylate, dimethylaminopropyl acrylate, acrylolyl chloride, itaconic anhydride, the methyl ester of acrylic acid, and mixtures thereof, and the reaction product co-polymerized with a member selected from the group consisting of styrene, 1,3-butadiene, isoprene, propylene, ethylene, methyl acrylate, vinyl acetate, methyl methacrylate, t-butyl methacrylate, and mixtures thereof, to provide polycationic latexes.

While the Examples disclosed hereinafter provide more specific details, the following general principles for carrying out the reactions herein are provided for assistance to the formulator. The reactions are conveniently carried out in water. The reaction temperatures can be in the range of about 30° C. to about 100° C., but a 60° C. reaction temperature is convenient. Reaction times can vary according to the temperature selected but reaction at 60° C. for 40 hours is convenient for laboratory syntheses. An emulsifier, e.g., oleyl ethoxylate as VOLPO-20 (Croda, Inc.), can be used in the reaction mixture, and some of this may be co-polymerized into the latex. In any event, the presence of the emulsifier results in a desirably fine suspension of the latex particles in the reaction medium. On a laboratory scale, it is convenient to use sufficient materials to provide a solids content of the final latex suspension in the range from about 10% to about 25% (wt.). The resulting suspension can be used directly to treat paper, or the like. The following Examples illustrate the preparation of the polycationic latexes, but are not intended to be limiting thereof.

EXAMPLE I
KYMEME/Acrylic Acid/Styrene/Butadiene Latex

| Reagents | Amount (grams) |
| --- | --- |
| VOLPO-20 | 0.322 |
| V-50* | 0.072 |
| KYMENE** | 0.722 |
| Acrylic Acid | 0.14 |
| Styrene | 2.86 |
| 1,3-Butadiene | 4.29 |
| Distilled water as reaction medium | 50 mls |

*V-50 initiator is 2,2' azobis(2-amidopropane) dihydrochloride available from WAKO, USA.
**As 5.5 g. of 13% solution.

The water reaction medium is sparged for 30 minutes with argon prior to use. A 250 ml glass reaction bottle equipped with a magnetic stir bar is flushed with nitrogen for 5 minutes. The KYMENE, VOLPO-20, V-50 initiator and distilled water are placed in the reaction bottle, which is sealed with a rubber gasket and two-holed bottle cap. The mixture is argon sparged for 30 minutes. The acrylic acid is added using a syringe and the styrene is added using a syringe. The reaction bottle is placed in an ice bath. The 1,3-butadiene is condensed in dry ice. Using a double-ended syringe and argon pressure, the 1,3-butadiene is added to the reaction vessel. A rubber septum is wired in place over the bottle cap and the reaction bottle is placed in an oil bath at 60° C. for 40 hours, with slow stirring. At the end of this time, the reaction product is pulled and strained through a fine wire sieve to provide a suspension of a captioned latex at a solid content of 13.5%.

EXAMPLE II

The reaction of Example I is repeated under the same conditions, but using 0.722 g of KYMENE and 0.358 g of acrylic acid. The reaction product is a 12.8% polycationic latex suspension.

EXAMPLE III

The reaction of Example I is repeated, but with the amount of KYMENE increased to 1.44 g (11.1 g or 13% solution). The reaction product is a 11.5% solids suspension of polycationic latex. In an alternative mode, the KYMENE level can be decreased to 2.77 g of a 13% (wt.) KYMENE solution to provide a polycationic latex suspension (13.6% wt. solids).

EXAMPLE IV

Following the procedure of Example I, a polycationic latex is prepared, but with the substitution of methacrylic acid (0.14 g) for the acrylic acid used in Example I, and with the use of 0.722 g of KYMENE. The reaction is allowed to proceed for 26 hours at 60° C. The reaction product is an aqueous suspension of a polycationic latex.

EXAMPLE V

Following the procedure of Example 1, a polycationic latex is prepared, but with the substitution of 0.14 g of glycidyl methacrylate for the acrylic acid used in Example I. The reaction product is an aqueous suspension of the polycationic latex.

EXAMPLE VI

Preparation of a Handsheet 2.65 g (2.50 g dry wt.) unrefined Northern Softwood Kraft (NSK) pulp is dispersed in 500 ml tap water at ambient Ph (ca. 7.5).

5.0% (0.984 g) of the polycationic latex of Example I is added to the pulp slurry and stirred for 30 minutes.

The handsheet is made on a standard Deckle Box using tap water at ambient pH (ca. 7.5) and dried on a drum dryer at 110°-115° C.

EXAMPLE VII

The applicability of a polycationic latex as a wet-strength additive for a continuous papermaking process is as follows. Approximately 220 kg (dry weight) of refined northern softwood Kraft pulp is dispersed in water at the consistency of about 2.5% and kept in a stirred holding tank. About 400 liters of cationic latex prepared according to Example I are added to the pulp to achieve the wet-end deposition of the binder.

The latex-treated pulp is then fed to a pilot scale paper machine (equipped with normal papermaking process components, such as headbox, forming wire, and continuous dryer) at a rate of about 80 l/min. The paper machine is operated at the production speed of 200 m/min.

The latex content of the final paper products can be measured by x-ray fluorescence analysis. The analysis is done by brominating the unsaturated double bonds of a styrene-butadiene rubber component of the latex and then measuring the x-ray fluorescence intensity. The estimated latex add-on level for the sample measured by this method is on the order of 11-12%. The wet strength of the latex-containing paper product produced by a continuous pilot paper machine can be determined by measuring the tensile strength required to tear a one-inch-wide strip of paper product after the sample is soaked in water.

The following Example illustrates the preparation of paper-type sheets comprising a polycationic wet-strength agent and a polyanionic absorbent gelling material.

EXAMPLE VIII

Preparation of Superabsorbent Layered Handsheet Paper

Two separate slurries are prepared comprising 1.06 g (1.0 g dry wt.) 40% wt. unrefined NSK pulp in 250 ml distilled water, adjusted to pH 8.5 (0.1 N sodium hydroxide).

The polycationic latex of Example I (0.652 g) is added to each of the two NSK/water slurries and stirred for 30 minutes.

0.5 G of commercial SANWET (acrylate-starch graft) absorbent gelling material is prepared as a fine powder.

Each separate slurry is formed on the Deckle Box in distilled water at pH 8.5 and placed on a transfer fabric in the following order: top layer NSK sheet; middle layer powdered SANWET; bottom layer NSK sheet.

The layered sheet is transferred via a vacuum slit to a transfer sheet to form the finished paper handsheet. The finished handsheet is passed over a high vacuum twice and a second transfer sheet is placed on top of the finished sheet. The resulting sheet is passed over a drum dryer (155° C.) 10-12 times, until dry.

EXAMPLE VIX

The procedure of Example I is repeated, but the styrene/butadiene monomer mixture is replaced by the following: styrene/isoprene (1:1 wt.); isoprene; and ethylene, respectively.

What is claimed is:

1. A composition which comprises the esterification reaction product of a compound containing the following repeat units:

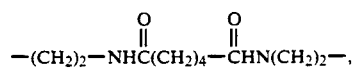

wherein R is $$-(CH_2)_2-NHC(CH_2)_4-CHN(CH_2)_2-,$$
$$\phantom{-(CH_2)_2-NH}\overset{O}{\|}\phantom{(CH_2)_4-}\overset{O}{\|}$$

and a carboxylate reactant, wherein said carboxylate reactant is a member selected from the group consisting of acrylic acid, methacrylic acid, glycidyl methacrylate, and mixtures thereof, whereby esterified compositions having an unsaturated polymerizable hydrocarbon moiety are secured.

* * * * *